US009796797B2

(12) United States Patent
Yoo et al.

(10) Patent No.: US 9,796,797 B2
(45) Date of Patent: Oct. 24, 2017

(54) POLYETHYLENE WITH CONTROLLED WAX CONTENT, CHLORINATED POLYETHYLENE THEREOF AND MOLDED ARTICLE PRODUCED FROM THE CHLORINATED POLYETHYLENE

(71) Applicant: LG CHEM, LTD., Seoul (KR)

(72) Inventors: Soung Hun Yoo, Daejeon (KR); Geun Yeol Bae, Daejeon (KR); Sang Rok Do, Daejeon (KR)

(73) Assignee: LG Chem, Ltd., Seoul (KR)

( * ) Notice: Subject to any disclaimer, the term of this patent is extended or adjusted under 35 U.S.C. 154(b) by 573 days.

(21) Appl. No.: 14/383,050

(22) PCT Filed: Apr. 17, 2014

(86) PCT No.: PCT/KR2014/003379
§ 371 (c)(1),
(2) Date: Sep. 4, 2014

(87) PCT Pub. No.: WO2014/171775
PCT Pub. Date: Oct. 23, 2014

(65) Prior Publication Data
US 2016/0229931 A1 Aug. 11, 2016

(30) Foreign Application Priority Data

Apr. 19, 2013 (KR) .................. 10-2013-0043729
Apr. 15, 2014 (KR) .................. 10-2014-0044897

(51) Int. Cl.
| | | |
|---|---|---|
| C08F 110/02 | (2006.01) |
| C08F 210/02 | (2006.01) |
| C08J 5/18 | (2006.01) |
| C08J 3/24 | (2006.01) |
| H01B 3/44 | (2006.01) |
| C08K 5/14 | (2006.01) |
| B29C 71/02 | (2006.01) |
| B32B 1/02 | (2006.01) |
| B29C 47/88 | (2006.01) |
| B29B 7/52 | (2006.01) |
| B32B 1/08 | (2006.01) |
| C08F 8/20 | (2006.01) |
| C08F 210/10 | (2006.01) |
| C08F 210/04 | (2006.01) |
| C08F 210/08 | (2006.01) |
| C08F 210/06 | (2006.01) |
| C08F 255/02 | (2006.01) |

(52) U.S. Cl.
CPC ............. *C08F 110/02* (2013.01); *B29B 7/52* (2013.01); *B29C 47/88* (2013.01); *B29C 71/02* (2013.01); *B32B 1/02* (2013.01); *B32B 1/08* (2013.01); *C08F 8/20* (2013.01); *C08F 210/02* (2013.01); *C08F 210/04* (2013.01); *C08F 210/06* (2013.01); *C08F 210/08* (2013.01); *C08F 210/10* (2013.01); *C08F 255/023* (2013.01); *C08J 3/247* (2013.01); *C08J 5/18* (2013.01); *C08J 7/08* (2013.01); *C08K 5/14* (2013.01); *H01B 3/441* (2013.01); *C08J 2323/28* (2013.01); *C08J 2391/06* (2013.01); *Y10T 428/139* (2015.01); *Y10T 428/1352* (2015.01); *Y10T 428/1393* (2015.01)

(58) Field of Classification Search
CPC ........ C08F 110/02; C08F 8/20; C08F 210/02; C08F 210/04; C08F 210/06; C08F 210/08; C08F 210/10; C08F 255/023; C08J 3/247; C08J 5/18; C08J 7/08; C08J 2323/28; C08J 2391/06; B29B 7/52; Y10T 428/1352; Y10T 428/139; Y10T 428/1393; B29C 47/88; B29C 71/02; B32B 1/02; B32B 1/08
USPC .................................. 264/236, 331.17, 349
See application file for complete search history.

(56) References Cited

U.S. PATENT DOCUMENTS

| | | | |
|---|---|---|---|
| 3,110,709 A | 11/1963 | Canterino | |
| 4,197,381 A * | 4/1980 | Alia .................... | B29C 47/0004 264/171.19 |
| 4,197,386 A | 4/1980 | Schoen | |
| 4,440,925 A * | 4/1984 | Ohorodnik ............... | C08F 6/24 525/356 |
| 5,739,226 A | 4/1998 | Spitz et al. | |
| 2006/0293424 A1* | 12/2006 | Tse ........................ | C08F 255/02 524/270 |

FOREIGN PATENT DOCUMENTS

| | | |
|---|---|---|
| DE | 2806653 A1 | 8/1978 |
| JP | 04-224804 A | 8/1992 |
| KR | 100148829 B1 | 12/1995 |
| KR | 10-2003-0028572 A | 4/2003 |
| KR | 10-2004-0087100 A | 10/2004 |
| KR | 10-2009-0054487 A | 6/2009 |
| KR | 10-2009-0088620 A | 8/2009 |
| WO | 2010-132811 A1 | 11/2010 |

* cited by examiner

*Primary Examiner* — Walter B Aughenbaugh
(74) *Attorney, Agent, or Firm* — Dentons US LLP

(57) ABSTRACT

Disclosed are polyethylene, chlorinated polyethylene thereof and a molded article produced from the chlorinated polyethylene. More specifically, disclosed are polyethylene for preparation of chlorinated polyethylene, the polyethylene having a molecular weight distribution (MWD) of 5 or less, a melting index (5.0 kg) of 0.1 to 10 dg/min, a weight average molecular weight of 50,000 to 300,000 g/mol, a melting temperature of 125 to 135° C., a wax content of 0.0001 to 3% by weight or 0.01 to 0.3% by weight and a density of 0.94 g/cm³ or more, chlorinated polyethylene thereof and a molded article produced from the chlorinated polyethylene.

19 Claims, No Drawings

POLYETHYLENE WITH CONTROLLED WAX CONTENT, CHLORINATED POLYETHYLENE THEREOF AND MOLDED ARTICLE PRODUCED FROM THE CHLORINATED POLYETHYLENE

This application is a National Stage Application of International Patent Application No. PCT/KR2014/003379, filed on Apr. 17, 2014, which claims priority to and the benefit of Korean Patent Application Nos. 10-2013-0043729 filed on Apr. 19, 2013, and 10-2014-0044897 filed on Apr. 15, 2014, in the Korean Intellectual Property Office, all of which are hereby incorporated by reference.

TECHNICAL FIELD

The present invention relates to polyethylene with a controlled wax content, chlorinated polyethylene thereof and a molded article produced from the chlorinated polyethylene. More specifically, the present invention relates to polyethylene with a narrow molecular weight distribution and a controlled wax content, chlorinated polyethylene with superior thermal stability, electrical insulation property, mechanical properties and the like prepared from the polyethylene, and a molded article with superior tensile strength produced from the chlorinated polyethylene.

BACKGROUND ART

Polyethylene is a chain-type polymer compound produced by polymerization of ethylene and is classified into low density polyethylene (LDPE) and High-density polyethylene (HDPE) according to density thereof.

The High-density polyethylene has superior softening point, hardness, strength and electrical insulation properties and is thus used for a variety of containers, packaging films, fibers, pipes, packings, insulating materials and the like.

Chlorinated polyethylene is obtained by chlorinating polyethylene with chlorine.

In general, chlorinated polyethylene may be prepared by reacting polyethylene with chlorine in a suspension or reacting polyethylene with chlorine in an aqueous HCl solution.

Chlorinated polyethylene exhibits superior chemical resistance, weatherability, processability and the like, and is thus widely used for impact modifiers of wire coating materials, film coating materials and the like.

DISCLOSURE

Technical Problem

Therefore, the present invention has been made in view of the above problems, and it is an object of the present invention to provide polyethylene with a narrow molecular weight distribution and a controlled wax content, chlorinated polyethylene with superior thermal stability, electrical insulation property, mechanical properties and the like prepared from the polyethylene, and a molded article with superior tensile strength produced from the chlorinated polyethylene.

The above and other objects can be accomplished by the present disclosure given below.

Technical Solution

In accordance with one aspect of the present invention, provided is polyethylene for preparation of chlorinated polyethylene, the polyethylene having a molecular weight distribution (MWD) of 5.0 or less, a melting index (5.0 kg) of 0.01 to 10 dg/min, a weight average molecular weight of 50,000 to 300,000 g/mol, a melting temperature of 125 to 135° C., a wax content of 0.0001 to 3% by weight or 0.01 to 0.3% by weight, and a density of 0.94 $g/cm^3$ or more.

In accordance with another aspect of the present invention, provided are chlorinated polyethylene prepared by reacting the polyethylene with chlorine and a method for preparing the same.

In accordance with another aspect of the present invention, provided is a molded article produced by extruding and/or cross-linking the chlorinated polyethylene.

Advantageous Effects

As apparent from the fore-going, the present invention advantageously provides polyethylene with a narrow molecular weight distribution and a controlled wax content, chlorinated polyethylene with superior thermal stability, electrical insulation property, mechanical properties and the like prepared from the polyethylene, and a molded article with superior tensile strength produced from the chlorinated polyethylene.

BEST MODE

Hereinafter, the polyethylene, chlorinated polyethylene thereof and the molded article produced from the chlorinated polyethylene according to the present invention will be described in detail.

The polyethylene according to the present invention has a molecular weight distribution (MWD) of 5.0 or less, a melting index (5.0 kg) of 0.1 to 10 dg/min, a weight average molecular weight of 50,000 to 300,000 g/mol, a melting temperature of 125 to 135° C., a wax content of 0.0001 to 3% by weight or 0.01 to 0.3% by weight, and a density of 0.94 $g/cm^3$ or more and is used for preparation of chlorinated polyethylene.

The polyethylene according to the present invention is not blocked upon chlorination and is thus sufficiently neutralized and washed, unlike conventional polyethylene having a high or uncontrolled wax content, thus advantageously greatly improving production efficiency, thermal stability, tensile strength after cross-linking, insulation property and the like of chlorinated polyethylene.

The polyethylene according to the present invention has a low molecular weight (≤5,000 g/mol) content of 0.01 to 5% by weight, 0.1 to 3% by weight or 0.1 to 1% by weight. Chlorinated polyethylene prepared using polyethylene satisfying this range has a high Mooney viscosity and elongation and thus exhibits superior tensile strength after cross-linking and insulation property.

In another example, the melting index (5.0 Kg) is 0.3 to 7 dg/min, or 1.5 to 4.5 dg/min.

In another example, the weight average molecular weight is 100,000 to 250,000 g/mol, or 100,000 to 200,000 g/mol.

In another example, the molecular weight distribution (MWD) is 2.0 to 4.0, or 2.1 to 3.4. In another example, the wax content is 0.05 to 0.2% by weight or 0.05 to 0.15% by weight. A powder of chlorinated polyethylene prepared using polyethylene satisfying this range has much pores and can be advantageously thus prepared within a greatly shortened time due to easy chlorination, washing, neutralization, dehydration, drying and the like thereof.

As herein used, the wax means polyethylene having a low molecular weight extracted with n-heptane and the wax content means percentage (%) by weight of the wax in a standard sample.

In another example, the melting temperature is 130 to 135° C.

In another example, the density is 0.945 to 0.955 g/cm$^3$.

The polyethylene for example has an average particle size of 30 to 400 μm, 80 to 300 μm, or 100 to 220 μm.

The polyethylene according to the present invention may be for example prepared with a metallocene catalyst or a catalyst composition containing the same.

The polyethylene according to the present invention may be for example prepared by reacting an ethylene monomer with a catalyst in the presence of a solvent in a continuous stirred tank reactor (CSTR) or a continuous flow reactor (PFR).

The chlorinated polyethylene according to the present invention is prepared by reacting the polyethylene according to the present invention with chlorine.

The chlorinated polyethylene has for example a chlorine content of 20 to 45% by weight, 31 to 40% by weight or 33 to 38% by weight.

The chlorinated polyethylene may have for example a Mooney viscosity of 70 to 110 or 87 to 100.

The chlorinated polyethylene for example has a volume resistance of $10^{13}$ to $10^{17}$ Ωcm, $10^{14}$ to $10^{17}$ Ωcm, or $10^{15}$ to $10^{16}$ Ωcm. Within this range, the chlorinated polyethylene advantageously exhibits superior insulation property when used for wire coating.

The chlorinated polyethylene for example has thermal stability of 160 to 180° C. or 170 to 175° C. Within this range, advantageously, crosslinking density is excellent and tensile strength is thus superior.

The chlorinated polyethylene for example has a cross-linking torque of 1.0 to 3.0 Nm or 1.5 to 2.5 Nm. Within this range, crosslinking density and tensile strength are advantageously excellent.

The chlorinated polyethylene is for example random chlorinated polyethylene.

Advantageously, the chlorinated polyethylene according to the present invention stably maintains the powder state during chlorination, neutralization, washing and drying, and exhibits superior mechanical properties and excellent thermal stability and electrical insulation property.

The chlorinated polyethylene according to the present invention is for example prepared by dispersing polyethylene in water using an emulsifier and a dispersant and reacting the resulting dispersion with chlorine in the presence of a catalyst.

The emulsifier is for example polyether or polyalkylene oxide.

The dispersant is for example a polymer salt or an organic acid polymer salt.

The organic acid is for example methacrylic acid, acrylic acid or the like.

The catalyst is for example a chlorination catalyst. In another example, the catalyst is peroxide or organic peroxide.

The chlorine is for example used alone or in combination with inert gas.

The final chlorination temperature is for example 60 to 150° C., 70 to 145° C., 90 to 140° C. or 130 to 137° C.

The chlorination time is for example 10 minutes to 10 hours, 1 to 6 hours or 2 to 4 hours.

In another example, the chlorinated polyethylene according to the present invention may be prepared by dispersing 100 parts by weight of polyethylene, 0.01 to 1.0 parts by weight or 0.05 to 0.5 parts by weight of an emulsifier and 0.1 to 10 parts by weight or 0.5 to 5.0 parts by weight of a dispersant in water, and then reacting the resulting dispersion with 0.01 to 1.0 part by weight or 0.05 to 0.5 parts by weight of a catalyst and 80 to 200 parts by weight or 100 to 150 parts by weight of chlorine.

The chlorinated polyethylene prepared by reaction or chlorination is for example obtained as powdery chlorinated polyethylene after neutralization, washing and drying.

The neutralization is for example carried out by neutralizing the reaction product obtained by chlorination with a basic solution at 75 to 80° C. for 4 to 8 hours.

The molded article according to the present invention is for example prepared by roll-mill compounding the chlorinated polyethylene according to the present invention and then extruding the compounded chlorinated polyethylene.

In another example, the molded article according to the present invention is prepared by roll-mill compounding the chlorinated polyethylene according to the present invention, followed by extruding and cross-linking (curing).

The molded article according to the present invention for example has a volume resistance of $1 \times 10^{14}$ Ωcm to $200 \times 10^{14}$ Ωcm, $50 \times 10^{14}$ Ωcm to $150 \times 10^{14}$ Ωcm, or $70 \times 10^{14}$ Ωcm to $120 \times 10^{14}$ Ωcm. Within this range, the molded article is suitable for use as a material for wire coating and film coating.

The roll-mill compounding is for example carried out on chlorinated polyethylene further containing at least one selected from the group consisting of a peroxide cross-linking agent, calcium carbonate ($CaCO_3$), talc and the like.

The extrusion is for example carried out in a single screw extruder.

The cross-linking (curing) is for example carried out after allowing the extrudate obtained by extrusion to stand at 100 to 180° C. for 3 to 60 minutes.

The molded article is for example a wire cable or a hose.

Hereinafter, preferred examples will be provided for better understanding of the present invention. It will be apparent to those skilled in the art that these examples are only provided to illustrate the present invention and various modifications and alterations are possible within the scope and technical range of the present invention. Such modifications and alterations fall within the scope of claims included herein.

EXAMPLE

Example 1

<High-Density Polyethylene>

13 kg/hr of ethylene and 0.1 g/hr of hydrogen were continuously reacted in a hexane slurry state using Metallocene K1 and K2 catalysts produced by LG Chem., Ltd. in a 220 L reactor of a pilot plant at a reactor temperature of 82° C. for 2 hours, followed by dehydration and drying, to prepare a High-density polyethylene powder. The prepared High-density polyethylene was present in a powder form and MI, density, wax content or the like thereof are shown in the following Table 1.

<Preparation of Chlorinated Polyethylene>

5,000 L of water and 550 kg of High-density polyethylene were added to a reactor, sodium polymethacrylate as a dispersant, oxypropylene and oxyethylene copolyether as emulsifiers, and benzoyl peroxide as a catalyst were added to the reactor and chlorination was performed with gas-phase chlorine at a final temperature of 132° C. for 3 hours.

The chlorination product was neutralized with NaOH or Na₂CO₃ for 4 hours, washed with running water for 4 hours and finally dried at 120° C. to prepare powdery chlorinated polyethylene.

<Roll-Mill Compounding>

100 parts by weight of the prepared chlorinated polyethylene, 28 parts by weight of trioctyl trimellitate (TOTM), 80 parts by weight of talc, 60 parts by weight of $CaCO_3$, 2 parts by weight of a calcium zinc stabilizer, 8 parts by weight of MgO, 0.4 parts by weight of St-A (stearic acid), 2.8 parts by weight of dicumyl peroxide and 4 parts by weight of TAIC 70% were compounded using a roll-mill at 133° C. for 2 minutes.

<Production of Sheet Without Cross-Linking (Curing)>

The compounding product was pressed in a hot press at 150° C. and 60 bar to produce a sheet.

<Production of Sheet Using Cross-Linking (Curing)>

The sheet (before cross-linking) was treated (cured) in an oven at 165° C. for 10 minutes to produce a cross-linked (cured) sheet.

Example 2

Chlorinated polyethylene and PVC composition samples were prepared in the same manner as in Example 1 except that 0.4 g/hr of hydrogen was added in the preparation of High-density polyethylene.

Comparative Example 1

Chlorinated polyethylene and PVC composition samples were prepared in the same manner as in Example 1 except that CE2080Z produced by LG Chem., Ltd. having properties shown in the following Table 1 was used as High-density polyethylene.

Test Example

Physical properties of the sheet and cross-linked (cured) sheet produced in Examples 1 and 2 and Comparative Example 1 were measured and results are shown in the following Table 1.

Melting index (dg/min): measured under the conditions of 190° C. and 5 kg in accordance with ASTM D-1238.

Weight average molecular weight (g/mol): measured by gel permeation chromatography. The device used herein was PL-GPC 220 (Agilent, Polymer Laboratories). 0.2% by weight of HDPE and 125 ppm of BHT were dissolved in trichlorobenzene (TCB) at 165° C. for 2 hours to produce a sample and the sample was analyzed by passing through three Mixed-B Columns and one Mixed-B Guard Column produced by Agilent (Polymer Laboratories).

Molecular weight distribution: obtained as a ratio (Mw/Mn) of weight average molecular weight (Mw) to number average molecular weight (Mn) measured by gel permeation chromatography.

Low molecular weight content (wt %): obtained by calculating a content of a molecular weight of 5,000 g/mol or less in molecular weights measured by gel permeation chromatography.

Melting temperature: measured at a temperature increase rate of 10° C./min using DSC.

Average particle size: nine sieves (63~850 μm) in total were mounted on a particle size analyzer Taylor-type Auto shaker and a particle size corresponding to 50% of the total weight of the sample was calculated.

Density: measured in accordance with ASTM D-792.

Wax content: a low molecular weight ingredient was extracted from 10 g of polyethylene with 150 ml of n-heptane at 98° C. for 3 hours and a content (by weight) of a solid after extraction with respect to a standard substance was measured.

Chlorine content: the sample was baked in an automatic quick furnace at 1,000° C., the produced gas was collected in $H_2O$ and Cl content was analyzed using an ion chromatograph (IC) device.

Mooney viscosity (processability): measured at 100° C. for 4 minutes in accordance with ASTM D-1626.

Cross-linking properties: scorch time and curing rate and the like were measured at 165° C. in accordance with ASTM D-2084.

Tensile strength and elongation: measured in accordance with ASTM D2240 sample size and tensile testing method. The tensile rate was 500 mm/min and the total number of samples used for measurement was 15.

Electrical insulation property: volume resistance of a flat cross-linked (cured) sheet (CPE) having a measurement area of 19.625 cm² and a sample thickness of 0.2 cm was measured in accordance with ASTM D257.

TABLE 1

| | Properties | Example 1 | Example 2 | Comparative Example 1 |
|---|---|---|---|---|
| Poly-ethylene (PE) | MI (5 kg) | 2 | 4 | 0.5 |
| | Density (g/cm³) | 0.953 | 0.954 | 0.956 |
| | Mw (g/mol) | 122,000 | 135,000 | 220,000 |
| | MWD | 3 | 2.5 | 13 |
| | Low molecular weight content (%) | 0.3 | 0.8 | 5.4 |
| | Wax content (wt %) | 0.07 | 0.11 | 0.35 |
| | Average particle size (μm) | 200 | 130 | 200 |
| | Melting temperature (° C.) | 133 | 133 | 132 |
| Sheet (CPE) | Chlorination (%) | 36 | 36 | 36 |
| | Mooney viscosity | 95 | 87 | 85 |
| | Tensile strength (MPa) | 6.5 | 6.2 | 8.3 |
| | Elongation (%) | 1,200 | 1,400 | 850 |
| Cross-linked sheet (CPE) | Tensile strength (MPa) | 10.8 | 10.5 | 9.2 |
| | Electrical insulation property(*10¹⁴Ωcm) | 110 | 80 | 5.2 |

As can be seen from Table 1 above, the polyethylene (Examples 1 and 2) according to the present invention had a wax content controlled to a low level, unlike conventional polyethylene, and thus caused no blocking problem upon chlorination and was sufficiently neutralized and washed, and chlorinated polyethylene prepared therefrom exhibited superior production efficiency, thermal stability and the like.

In addition, the chlorinated polyethylene sheet according to the present invention exhibited superior Mooney viscosity, tensile strength and elongation, and the cross-linked (cured) sheet produced by cross-linking the same exhibited considerably superior tensile strength and electrical insulation property.

In addition, chlorinated polyethylene prepared using polyethylene having a higher molecular weight distribution (MWD) and wax content (Comparative Example 1) exhibited bad Mooney viscosity, elongation, tensile strength after cross-linking and electrical insulation property.

Furthermore, Examples 1 and 2 in which a content of a low molecular weight of 5,000 g/mol or less was 0.01 to 5% by weight exhibited superior Mooney viscosity and elongation and excellent tensile strength after cross-linking and electrical insulation property.

What is claimed is:

1. Polyethylene for preparation of chlorinated polyethylene, the polyethylene having a molecular weight distribution (MWD) of 5 or less, a melting index (5.0 kg) of 0.1 to 10 dg/min, a weight average molecular weight of 50,000 to 300,000 g/mol, a melting temperature of 125 to 140° C., a density of 0.94 g/cm$^3$ or more and a wax content of 0.01 to 0.3% by weight.

2. The polyethylene according to claim 1, wherein the polyethylene has a low molecular weight (≤5,000 g/mol) content of 0.01 to 5% by weight.

3. The polyethylene according to claim 1, wherein the molecular weight distribution (MWD) is 2.1 to 3.4.

4. The polyethylene according to claim 1, wherein the melting index (5.0 kg) is 0.3 to 7 dg/min.

5. The polyethylene according to claim 1, wherein the melting temperature is 125 to 135° C.

6. The polyethylene according to claim 1, wherein the density is 0.945 to 0.955 g/cm$^3$.

7. The polyethylene according to claim 1, wherein the polyethylene has a wax content of 0.05 to 0.2% by weight.

8. The polyethylene according to claim 1, wherein the polyethylene has an average particle size of 30 to 400 μm.

9. The polyethylene according to claim 1, wherein the polyethylene is prepared in the presence of a metallocene catalyst.

10. Chlorinated polyethylene prepared by reacting the polyethylene according to claim 1 with chlorine.

11. The chlorinated polyethylene according to claim 10, wherein the chlorinated polyethylene has a chlorine content of 20 to 45% by weight.

12. The chlorinated polyethylene according to claim 10, wherein the chlorinated polyethylene has a Mooney viscosity of 70 to 110.

13. The chlorinated polyethylene according to claim 10, wherein the chlorinated polyethylene has a volume resistance of $10^{13}$ to $10^{17}$ Ωcm and thermal stability of 150 to 180° C.

14. An extrusion-molded article produced from the chlorinated polyethylene according to claim 10.

15. The extrusion-molded article according to claim 14, wherein the extrusion-molded article is cross-linked using a peroxide cross-linking agent.

16. The extrusion-molded article according to claim 15, wherein the extrusion-molded article has a volume resistance of $1 \times 10^{14}$ Ωcm to $200 \times 10^{14}$ Ωcm.

17. The extrusion-molded article according to claim 14, wherein the extrusion-molded article is a wire cable or a hose.

18. A method for preparing chlorinated polyethylene comprising:
    dispersing 100 parts by weight of the polyethylene according to claim 1, 0.1 to 0.2 parts by weight of an emulsifier, and 1 to 5 parts by weight of a dispersant in water; and
    reacting the resulting dispersion with 80 to 200 parts by weight of chlorine in the presence of 0.01 to 1.0 parts by weight of a catalyst.

19. A method for producing an extrusion-molded article comprising:
    a) roll-mill compounding the chlorinated polyethylene according to claim 10 with a cross-linking agent;
    b) extruding the compounded chlorinated polyethylene;
    c) allowing the extrudate to stand at 100 to 180° C. for 3 to 60 minutes; and
    d) cross-linking (curing) the extrudate.

* * * * *